(12) United States Patent
Fukatsu et al.

(10) Patent No.: US 9,937,871 B2
(45) Date of Patent: Apr. 10, 2018

(54) VEHICLE SEAT

(71) Applicant: TOYOTA BOSHOKU KABUSHIKI KAISHA, Aichi-ken (JP)

(72) Inventors: Satoshi Fukatsu, Anjo (JP); Tetsuya Tanaka, Kariya (JP); Teruyuki Shimizu, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 24 days.

(21) Appl. No.: 14/943,535

(22) Filed: Nov. 17, 2015

(65) Prior Publication Data

US 2016/0152191 A1 Jun. 2, 2016

(30) Foreign Application Priority Data

Nov. 28, 2014 (JP) ................................. 2014-241377

(51) Int. Cl.
*B60R 11/00* (2006.01)
*B60N 2/64* (2006.01)
(Continued)

(52) U.S. Cl.
CPC .............. *B60R 11/00* (2013.01); *B60N 2/015* (2013.01); *B60N 2/46* (2013.01); *B60N 2/64* (2013.01);
(Continued)

(58) Field of Classification Search
CPC .... B60N 2/4613; B60N 2/4606; A47C 7/543; B60R 11/00
(Continued)

(56) References Cited

U.S. PATENT DOCUMENTS 1,835,947 A * 12/1931 Johannsen ........... B60N 2/4613
297/113
5,752,739 A * 5/1998 Saeki ................... B60N 2/4613
297/113
(Continued)

FOREIGN PATENT DOCUMENTS

JP 9-277878 10/1997
JP H11-123122 A 5/1999
(Continued)

OTHER PUBLICATIONS

Office Action issued in Japan Counterpart Patent Appl. No. 2014-241377, dated Jan. 30, 2018, along with an english translation thereof.

*Primary Examiner* — Syed A Islam
(74) *Attorney, Agent, or Firm* — Greenblum & Bernstein, P.L.C.

(57) ABSTRACT

A vehicle seat is provided with: a seat cushion; and a seat back. The seat back includes: a seat pad; a reinforcing member that is formed by a linear or planer member and reinforces the seat pad; and an accommodating section provided in the seat pad and receives an installable component that is configured as a separate body that is separate from the seat back. The reinforcing member has an engaging portion that protrude into the accommodating section, the engaging portion being configured to be engageable with an engaged portion that is provided on the installable component. The vehicle seat is configured to allow the installable component to be installed in the accommodating section while positioning the installable component with respect to the accommodating section in a state where the engaging portion and the engaged portion are engaged with each other.

11 Claims, 5 Drawing Sheets

(51) Int. Cl.
*B60N 2/68* (2006.01)
*B60N 2/70* (2006.01)
*B60N 2/015* (2006.01)
*B60N 2/46* (2006.01)

(52) U.S. Cl.
CPC ............... *B60N 2/682* (2013.01); *B60N 2/70* (2013.01); *B60R 2011/0015* (2013.01); *B60R 2011/0047* (2013.01)

(58) Field of Classification Search
USPC ..................................... 297/188.04, 113, 112
See application file for complete search history.

(56) References Cited

U.S. PATENT DOCUMENTS

| | | | |
|---|---|---|---|
| 7,281,763 | B1 | 10/2007 | Hayashi et al. |
| 7,527,315 | B2* | 5/2009 | Sumida ................ B60N 2/4613 296/37.8 |
| 8,622,468 | B2* | 1/2014 | Masuda .................. B60N 2/66 297/113 |

FOREIGN PATENT DOCUMENTS

| | | |
|---|---|---|
| JP | 2002-120625 A | 4/2002 |
| JP | 2008-007101 A | 1/2008 |

\* cited by examiner

VEHICLE SEAT

CROSS-REFERENCE TO RELATED APPLICATION

This application claims priorities from Japanese Patent Application No. 2014-241377 filed on Nov. 28, 2014, the entire subject matters of which is incorporated herein by reference.

TECHNICAL FIELD

The present disclosure relates to a vehicle seat including a seat back upraised from a seat cushion and an accommodating section which is provided in the seat back and in which other installable component can be arranged.

BACKGROUND

In many vehicles, a floor console (an example of the installable component) is disposed along with a vehicle seat in consideration of convenience to occupants or the like. For example, in a vehicle disclosed in JP-A-H9-277878, a floor console is disposed between a driver seat and a passenger seat which are vehicle seats. Each of the driver seat and the passenger seat as vehicle seats includes a seat cushion and a seat back rising upward from the seat cushion. The floor console is a cubic box member which is formed by injection-molding an appropriate resin material and plural engaging protrusions are formed on the bottom end thereof. In the related art, a resin floor-shaping member is disposed on a vehicle floor surface and locking holes into which the engaging protrusions can be fitted are formed in the floor-shaping member. By inserting and fitting the engaging protrusions into the locking holes in the vertical direction, the floor console can be disposed on the vehicle floor surface between the driver seat and the passenger seat.

In the above-mentioned configuration, for example, in consideration of the shape or size of the vehicle seat or the like, a hole-shaped or cutout-shaped accommodating section in which the floor console is arranged may be provided in the seat back. The floor console is disposed in the accommodating section and the vehicle seat and the floor console are fixed to the vehicle floor surface. In this state, in consideration of appearance or the like, it is preferable that the floor console is disposed with an appropriate posture at an appropriate place in the accommodating section. However, in the related art, the floor console is fixed to only the vehicle floor surface. Accordingly, for example, when the positional relationship between the vehicle floor surface and the accommodating section varies, the floor console may not be appropriately disposed in the accommodating section.

SUMMARY

The present disclosure is made in consideration of the above-mentioned circumstances, and one of objects of the present disclosure is to appropriately position and dispose other installable component in an accommodating section of a seat back.

According to an illustrative embodiment of the present disclosure, there is provided a vehicle seat including: a seat cushion on which buttocks of an occupant is placed; and a seat back that is upraised with respect to the seat cushion, the seat back including: a seat pad having elasticity and support a back of the occupant; a reinforcing member that is formed by a linear or planer member and reinforces the seat pad; and an accommodating section provided in the seat pad and receives an installable component that is configured as a separate body that is separate from the seat back. The reinforcing member has an engaging portion that protrude into the accommodating section, the engaging portion being configured to be engageable with an engaged portion that is provided on the installable component. The vehicle seat is configured to allow the installable component to be installed in the accommodating section while positioning the installable component with respect to the accommodating section in a state where the engaging portion and the engaged portion are engaged with each other.

DETAILED DESCRIPTION

Figure 1:
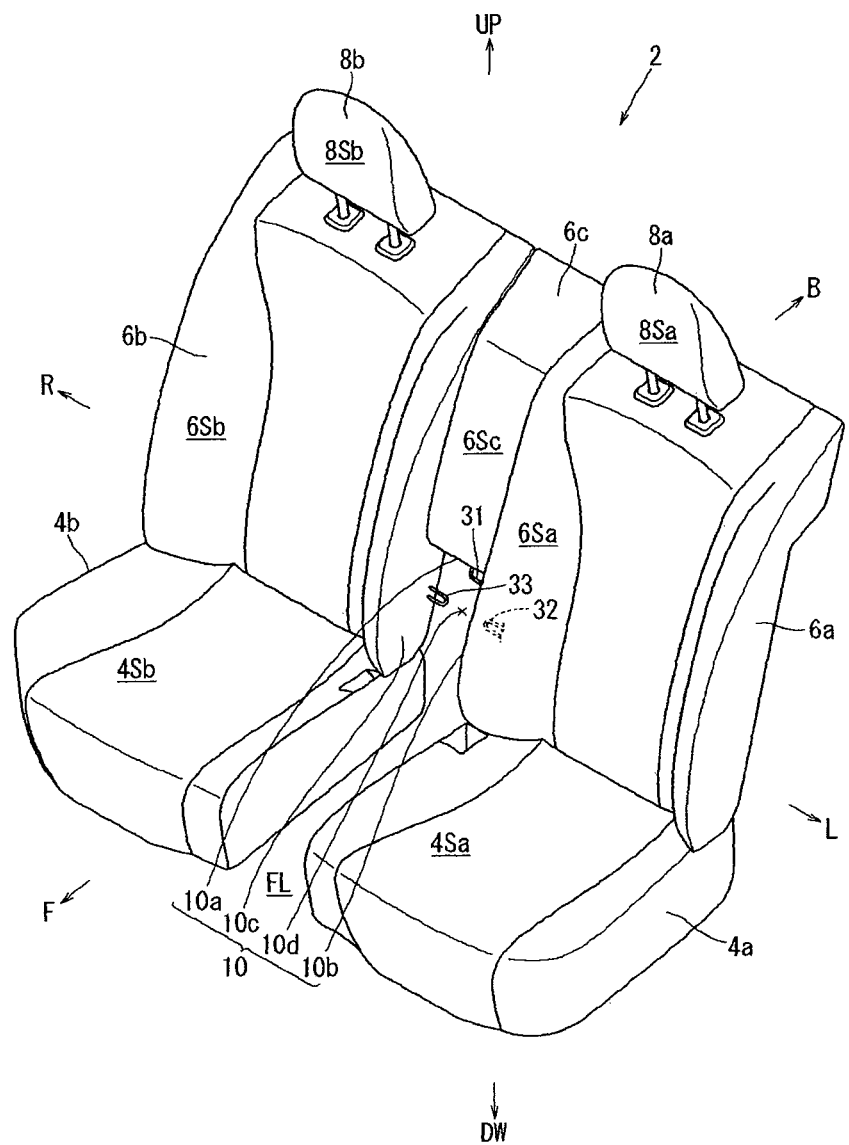
FIG. 1 is a perspective view illustrating a vehicle seat.

Hereinafter, embodiments of the disclosure will be described with reference to FIGS. 1 to 5. In the drawings, the front side of a vehicle seat is denoted by reference sign F, the back side of the vehicle seat is denoted by reference sign B, the upside of the vehicle seat is denoted by reference sign UP, the downside of the vehicle seat is denoted by reference sign DW, the right side of the vehicle seat is denoted by reference sign R, and the left side of the vehicle seat is denoted by reference sign L.

Figure 4:
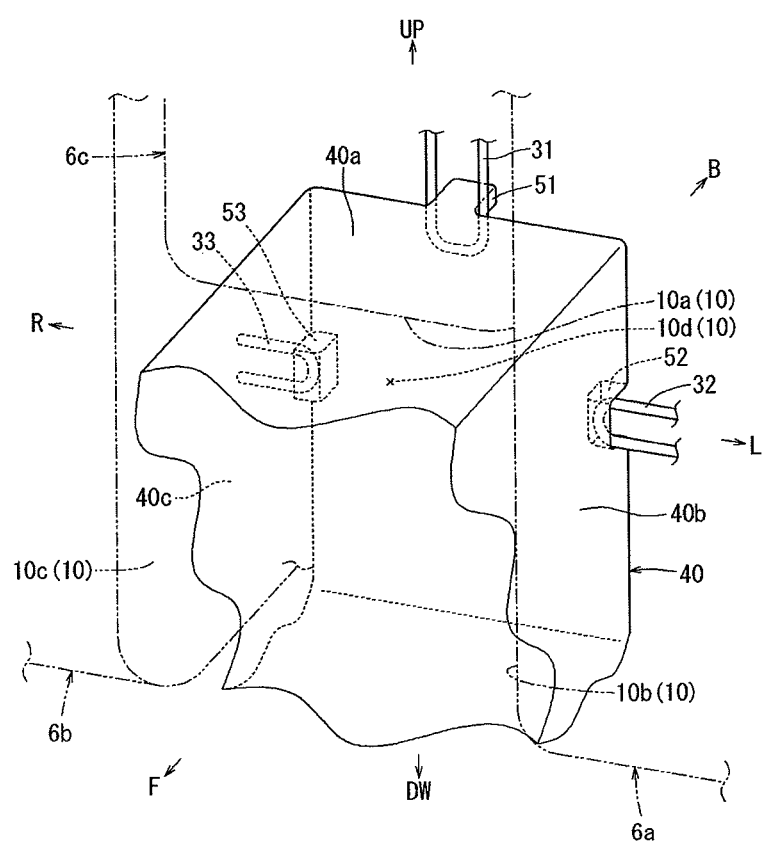
FIG. 4 is a perspective view illustrating a part of the vehicle seat and a part of other installable component.

As shown in FIGS. 1 and 4, a vehicle interior is provided with a vehicle seat 2 and a floor console 40. In the present embodiment, the floor console 40 is an example of a installable component that is arranged in an accommodating section, which is to be described later. Here, as illustrated in FIG. 1, the vehicle seat 2 is configured as a large-width seat on which plural occupants can sit and includes a pair of seat cushions 4a and 4b, a pair of seat backs (a first seat back 6a and a second seat back 6b), and a pair of headrests 8a and 8b. These seat-configuring members include seat pads (6P in FIG. 2) forming the outer shape of the seat and seat covers (4Sa, 4Sb, 6Sa, 6Sb, 6Sc, 8Sa, 8Sb) covering the seat pads.

Figure 2:
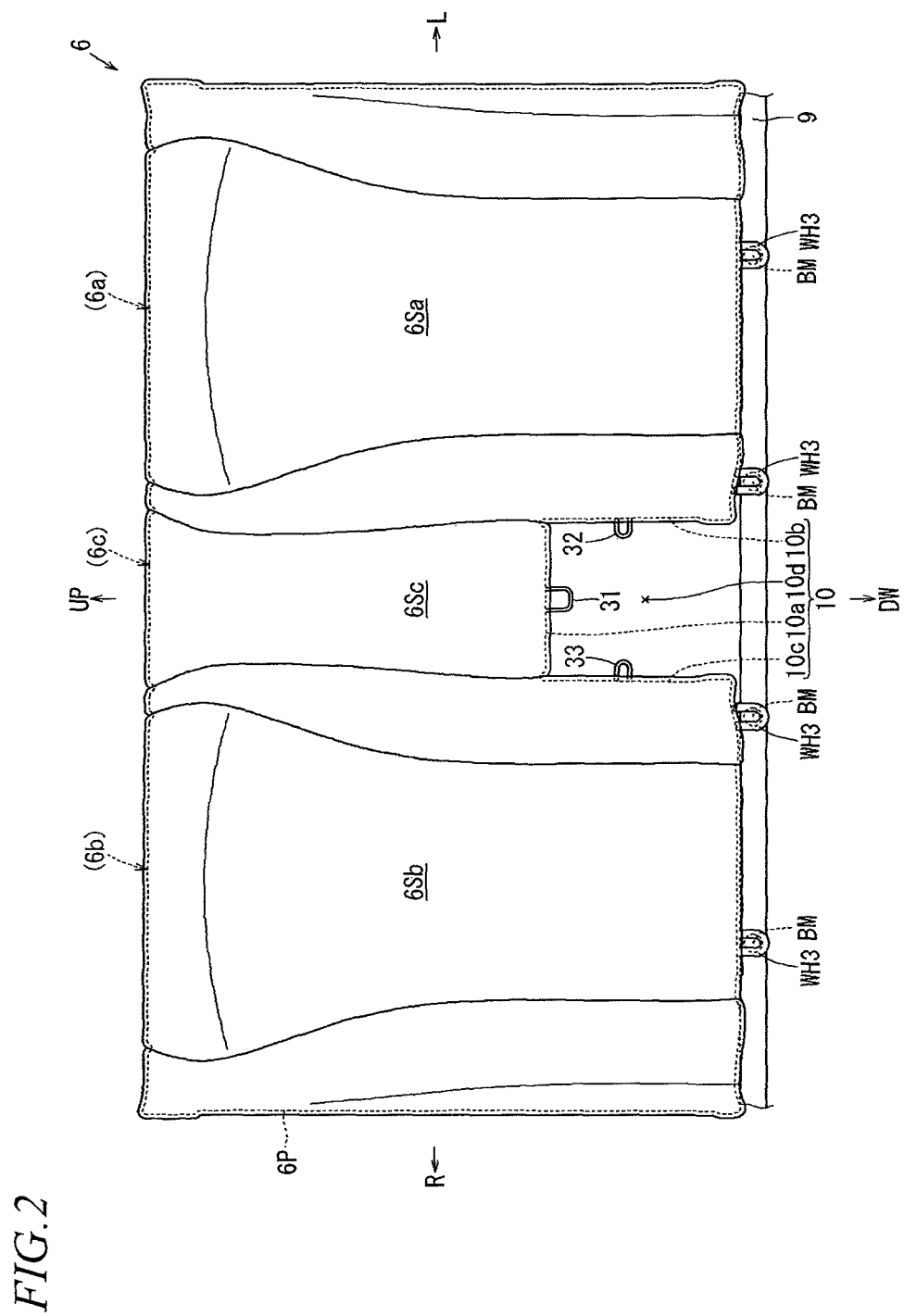
FIG. 2 is a front view of a seat pad.
Figure 3:
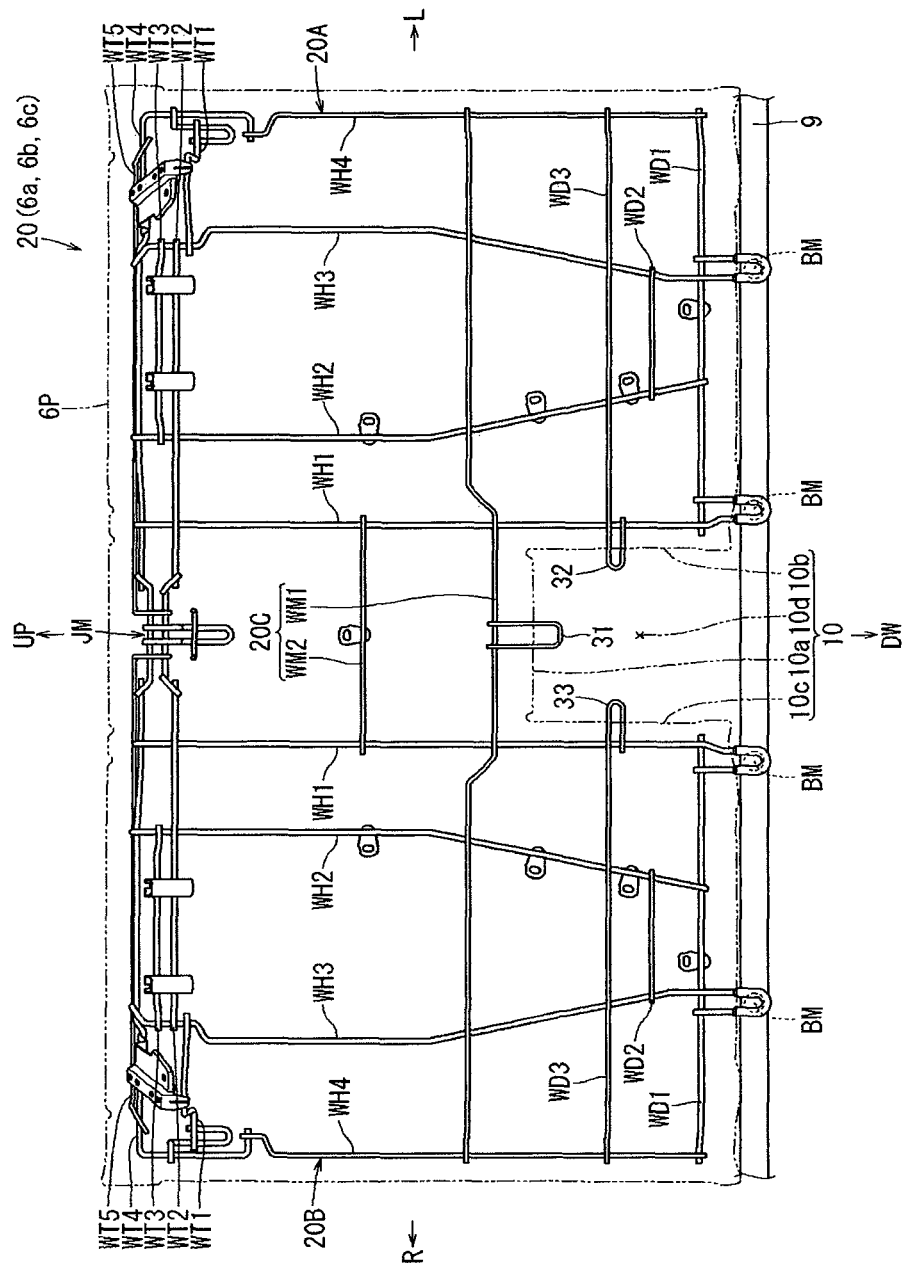
FIG. 3 is a front view of a reinforcing member.

In this embodiment, as illustrated in FIG. 1, the seat cushions 4a and 4b are disposed on a vehicle floor surface FL with an appropriate gap therebetween. As illustrated in FIGS. 1 and 2, the seat backs 6a and 6b (details of which will be described later) as a pair are connected by an intermediate section 6c disposed therebetween, and are fixed to the vehicle floor surface FL in an upright state on the back side of the seat cushions 4a and 4b using a fixing member 9. As illustrated in FIGS. 2 and 3, the fixing member 9 is a pipe member which is long in a seat width direction and both ends thereof are fixed to the vehicle floor surface FL using brackets not illustrated. As a result, the seat backs 6a and 6b are disposed in an upright state on the back side of the seat cushions 4a and 4b as illustrated in FIG. 1. The headrests 8a and 8b are disposed in the upper parts of the seat backs 6a and 6b in an upright state, respectively.

As illustrated in FIGS. 1 to 3, a pair of seat backs 6a and 6b includes an accommodating section 10, a reinforcing member 20, and plural engaging portions 31 to 33 as related constituent members (details of which will be described later) in addition to the seat pad 6p and the seat covers 6Sa to 6Sc. Here, the first seat back 6a disposed on the left side of the vehicle is a substantially rectangular member in a front view and a seat inside surface (10b) thereof is substantially flat. Similarly, the second seat back 6b disposed on the right side of the vehicle is a substantially rectangular member in a front view and a seat inside surface (10c) thereof is substantially flat. The intermediate section 6c is a substantially rectangular member in a front view which is disposed in a bridge shape between the upper part of the first seat back 6a and the upper part of the second seat back 6b and a bottom surface (10a) thereof is substantially flat.

In this embodiment, as illustrated in FIGS. 1 and 4, the floor console 40 (details of which will be described later) is disposed in the accommodating section 10 formed between the first seat back 6a and the second seat back 6b and is fixed to the vehicle floor surface FL. In such a type of configuration, it is preferable that the floor console 40 be appropriately positioned and disposed in the accommodating section 10. Accordingly, in this embodiment, the floor console 40 is appropriately positioned and disposed in the accommodating section 10 of the seat backs 6a and 6b using the following configurations (the engaging portions 31 to 33 and the engaged portions 51 to 53). The respective configurations will be described in detail.

The seat covers 6Sa to 6Sc are surface materials covering proper places of the seat pad 6P to be described later as illustrated in FIG. 1 and can be formed of fabric (such as woven fabric, knitted fabric, and non-woven fabric) or leather (such as natural leather and synthetic leather). The seat pad 6P is a member capable of elastically supporting an occupant as illustrated in FIG. 2 and can be formed of a foamed resin such as a polyurethane foam (with a density of 10 kg/m3 to 60 kg/m3). The seat pad 6P according to this embodiment has a rectangular shape which is longer in a seat width direction in a front view and has an outer shape in which the seat backs 6a and 6b and the intermediate section 6c are formed as a unified body.

As illustrated in FIGS. 1 to 4, the accommodating section 10 is a part in which the following floor console 40 (the installable component) can be disposed. The accommodating section 10 according to this embodiment is a cut-out part which is formed below the intermediate section 6c between the first seat back 6a and the second seat back 6b and penetrates the seat pad 6P in the thickness direction thereof. The accommodating section 10 includes an opened bottom side, a top side portion 10a, a first side portion 10b, and a second side portion 10c. The top side portion 10a is formed by the bottom surface of the intermediate section 6c and is disposed in a bridge shape between the first seat back 6a and the second seat back 6b. The first side portion 10b is a part which is formed by the lower part of a seat inside surface of the first seat back 6a. The second side portion 10c is a part which is formed by the lower part of a seat inside surface of the second seat back 6b and is disposed to face the first side portion 10b. In this embodiment, a space part 10d surrounded with the top side portion 10a and both side portions 10b and 10c has a size capable of accommodating the floor console 40 and is opened to a front side (the seating surface side) on which a back of the occupant is supported and to a back side (the back surface side) of the seat back 6a, 6b and 6c. The floor console 40 to be described later is fixed to the vehicle floor surface FL in a state in which the back part thereof is disposed in the accommodating section 10.

The reinforcing member 20 is a member reinforcing the seat pad 6P as illustrated in FIG. 3 and can be formed of a material having excellent rigidity (such as metal or hard resin). The reinforcing member 20 according to this embodiment is a substantially rectangular frame in which plural wire members (wire) to be described later are connected vertically and horizontally and includes a pair of basic parts 20A and 20B and a bridging part 20C. The basic parts 20A and 20B (details of which will be described later) are parts for reinforcing the seat pads of the corresponding seat backs 6a and 6b. The bridging part 20C (details of which will be described later) is a part for reinforcing the seat pad parts constituting the seat backs 6a and 6b and the intermediate section 6c and is disposed over the pair of basic parts 20A and 20B. The reinforcing member 20 can be formed in an embedded type as a unified body with the seat pad 6P, for example, at the same time as molding the seat pad 6P. For example, the reinforcing member 20 is disposed at an appropriate position in a molding machine (not illustrated) of the seat pad 6P. In this state, by supplying a molding material (liquid resin) of the seat pad 6P to the machine and foaming the molding material, the reinforcing member 20 can be unified with the seat pad 6P in an embedded type while molding the seat pad 6P.

As illustrated in FIG. 3, the basic part 20A of the first seat back 6a and the basic part 20B of the second seat back 6b have substantially the same configuration. Accordingly, the basic part 20A will be described below as an example, and the same elements as in the basic part 20B will be referenced by the same reference numerals and detailed description thereof will not be repeated. The basic part 20A according to this embodiment includes plural vertical wires (a first vertical wire WH1 to a fourth vertical wire WH4), plural lower horizontal wires WD1 to WD3, and plural upper horizontal wires WT1 to WT5.

The plural vertical wires WH1 to WH4 are wires extending in a seat height direction in a state in which the seat is upright. In this embodiment, the first to fourth vertical wires WH1 to WH4 are arranged in parallel from the seat depth side to the outside in this order as indicated by a direction of arrow L in FIG. 3 (see a direction of arrow R in FIG. 3 as for the second seat back 6b). The first vertical wire WH1 and the fourth vertical wire WH4 extend in a straight line shape in the vertical direction of the seat and are disposed at both ends which are large frame parts of the first seat back 6a. The second vertical wire WH2 and the third vertical wire WH3 have linear upper parts and lower parts inclined in a direction in which both come near to each other, and are disposed between the first vertical wire WH1 and the fourth vertical wire WH4. The vertical wires other than the fourth vertical wire WH4 are bent to the back side of the seat at the top end to reinforce the top surface side of the seat pad 6P. The first vertical wire WH1 and the third vertical wire WH3 are disposed to protrude downward from the lower horizontal wire WD1 to be described later which is disposed at the lower end of the seat. The lower ends of the first vertical wire WH1 and the third vertical wire WH3 are curved in a substantially U shape and are fixed to the fixing member 9 using bolt materials BM.

The plural horizontal wires WD1 to WD3 and WT1 to WT5 are wires extending in the seat width direction and are disposed in a bridge shape between some of the plural vertical wires WH1 to WH4. That is, the plural lower horizontal wires WD1 to WD3 have appropriate lengths, are disposed in a bridge shape between some of the lower parts of the first to fourth vertical wires WH1 to WH4, and are connected thereto. For example, the lower horizontal wire WD3 which is one of the plural lower horizontal wires crosses the first to fourth vertical wires WH1 to WH4 and are disposed in a region corresponding to the accommodating section 10. In this embodiment, the lower horizontal wire WD3 extrudes from the first vertical wire WH1 to the seat inside so as to protrude into the accommodating section 10. In addition, the plural upper horizontal wires WT1 to WT5 have appropriate lengths are disposed in a bridge shape between some of the upper parts of the first to fourth vertical wires WH1 to WH4, and are connected thereto. Some (WT2, WT4, and WT5) of the upper horizontal wires of the basic part 20A and some (WT2, WT4, and WT5) of the upper horizontal wires of the basic part 20B are connected to each other by a wire-shaped junction JM in the upper part of the intermediate section 6c.

The bridging part 20C is a part disposed over a pair of basic parts 20A and 20B and includes a first bridging wire WM1 and a second bridging wire WM2. The first bridging wire WM1 extends in the seat width direction above the lower horizontal wire WD3, is disposed to cross a pair of basic parts 20A and 20B, and is connected to the vertical wires. In this embodiment, the first bridging wire WM1 is bent downward at the central portion disposed in the lower part of the intermediate section 6c and is positioned immediately above the accommodating section 10. The second bridging wire WM2 has a short length and is disposed above the first bridging wire WM1. The second bridging wire WM2 is disposed in a bridge shape between the first vertical wire WH1 of the first seat back 6a and the first vertical wire WH1 of the second seat back 6b and is connected thereto.

As illustrated in FIGS. 2 to 4, the engaging portions (a first engaging portion 31, a second engaging portion 32, and a third engaging portion 33) are portions capable of engaging with appropriate positions of the floor console 40 (the installable component) to be described later and can be formed in the reinforcing member 20. As illustrated in FIG. 3, the first engaging portion 31 according to this embodiment is formed of a ring-shaped wire having a substantially U shape in a front view and is attached to the first bridging wire WM1 immediately above the accommodating section 10 in a state in which the seat back is upright. The first engaging portion 31 is disposed at the center of the accommodating section 10 in the seat width direction so as to protrude downward from the top side portion 10a of the accommodating section 10 into the accommodating section 10.

As illustrated in FIG. 3, the second engaging portion 32 can be formed by the lower horizontal wire WD3 which is a part of the basic part 20A. In this embodiment, the second engaging portion 32 can be formed by bending an end of the lower horizontal wire WD3 extending in the seat width direction in a substantially lateral U shape. The second engaging portion 32 protrudes rightward from the first side portion 10b of the accommodating section 10 into the accommodating section 10. The third engaging portion 33 can be formed by the lower horizontal wire WD3 which is a part of the basic part 20B. In this embodiment, the third engaging portion 33 can be formed by bending an end of the lower horizontal wire WD3 extending in the seat width direction in a substantially lateral U shape. The third engaging portion 33 protrudes leftward from the second side portion 10c of the accommodating section 10 into the accommodating section 10. In this embodiment, the second engaging portion 32 and the third engaging portion 33 are disposed to face each other and a clearance in which the floor console 40 to be described later can be disposed is formed therebetween.

As illustrated in FIG. 4, the floor console 40 is a rectangular parallelepiped box member which is longer in the vehicle longitudinal direction and includes a top surface portion 40a, a first side surface portion 40b, a second side surface portion 40c, and plural engaged portions 51 to 53 to be described later (only a part of the floor console is illustrated in FIG. 4 for the purpose of convenience). In this embodiment, the back part of the floor console 40 is disposed in the accommodating section 10 while positioning the floor console 40 in the front-back direction of the seat as will be described later. In this state, the floor console 40 is fixed to the vehicle floor surface using a fixing portion (not illustrated) formed on the bottom surface thereof. In this state, the top surface portion 40a of the floor console 40 is disposed to face the top side portion 10a of the accommodating section 10. The first side surface portion 40b is disposed to face the first side portion 10b of the accommodating section 10 and the second side surface portion 40c is disposed to face the second side portion 10c of the accommodating section 10.

As illustrated in FIG. 4, the engaged portions (a first engaged portion 51, a second engaged portion 52, and a third engaged portion 53) are portions capable of engaging with the corresponding engaging portions 31 to 33. The first engaged portion 51 is formed as a plate-like protruding piece protruding backward from the back end of the top surface portion 40a in a state in which the floor console 40 is disposed, and can be inserted into the ring-shaped first engaging portion 31 from the seating surface side. In this embodiment, the first engaged portion 51 is formed at the center of the top surface portion 40a and is disposed at a position which can be inserted into the first engaging portion 31. The second engaged portion 52 is a depressed portion formed in the first side surface portion 40b and can engage with the second engaging portion 32 from the seat width direction. The third engaged portion 53 is a depressed portion formed in the second side surface portion 40c and can engage with the third engaging portion 33 from the seat width direction. The second engaged portion 52 and the third engaged portion 53 are opened on the back surface side of the floor console 40 and the corresponding engaging portions can be inserted thereinto from the front-back direction of the seat.

As illustrated in FIG. 4, the pair of seat backs 6a and 6b and the floor console 40 are disposed at appropriate positions on the vehicle floor surface. The pair of seat backs 6a and 6b are fixed to the vehicle floor surface FL using the fixing member 9 in an upright state and then the floor console 40 is disposed in the accommodating section 10 and is fixed onto the vehicle floor surface. In this configuration, it is preferable that the floor console 40 be appropriately positioned and disposed in the accommodating section 10. Accordingly, this embodiment employs a configuration in which the floor console 40 is positioned and disposed in the accommodating section 10 by causing the corresponding engaging portions 31 to 33 and the corresponding engaged portions 51 to 53 to engage with each other.

That is, as illustrated in FIG. 4, the floor console 40 is inserted into the accommodating section 10 from the seating surface side and the first engaged portion 51 is inserted into the first engaging portion 31 protruding from the top of the accommodating section 10 from the seating surface side to engage with each other. By this engagement of the first engaging portion 31 and the first engaged portion 51, the floor console 40 is disposed at the center of the accommodating section 10 and the relative movement thereof in the seat width direction is regulated. At the same time, the second engaging portion 32 is inserted into the second engaged portion 52 and then both engage with each other from the seat width direction. At the same time, the third engaging portion 33 is inserted into the third engaged portion 53 and then both engage with each other from the seat width direction. By this engagement of the second engaging portion 32 and the second engaged portion 52 (the third engaging portion 33 and the third engagement portion 53), the relative movement of the floor console 40 in the vertical direction is regulated and the rotation of the floor console 40 around an axis is appropriately prevented. In this way, in this embodiment, by the engagements of the engaging portions 31 to 33 and the engaged portions 51 to 53, it is possible to appropriately regulate the movement of the floor console 40 in the vertical and horizontal directions relative to the accommodating section 10 and to position and dispose the floor console at appropriate positions in the accommodating section 10. In this state, the floor console 40 is fixed onto the vehicle floor surface. Accordingly, referring to FIGS. 1 to 4, even when the positional relationship between the vehicle floor surface FL and the seat backs 6a and 6b (the accommodating section 10) varies, it is possible to dispose the floor console 40 at appropriate positions in the accommodating section 10 in an appropriate posture.

As described above, in this embodiment, the engaging portions 31 to 33 can be stably formed in the reinforcing member 20 for reinforcing the seat pad 6P. By the engagements of the engaging portions 31 to 33 and the engaged portions 51 to 53, the floor console 40 can be appropriately positioned and disposed in the accommodating section 10. In this embodiment, by inserting the first engaged portion 51 into the ring-shaped first engaging portion 31 from the seat surface side to engage with each other, it is possible to prevent the relative movement of the floor console 40 in the seat width direction. In addition, by causing the second engaging portion 32 (the third engaging portion 33) to engage with the second engaged portion 52 (the third engaged portion 53), it is possible to regulate the relative movement of the floor console 40 in the vertical direction. Accordingly, according to this embodiment, it is possible to appropriately position and dispose the floor console 40 in the accommodating section 10 of the seat backs 6a and 6b.

Figure 5:
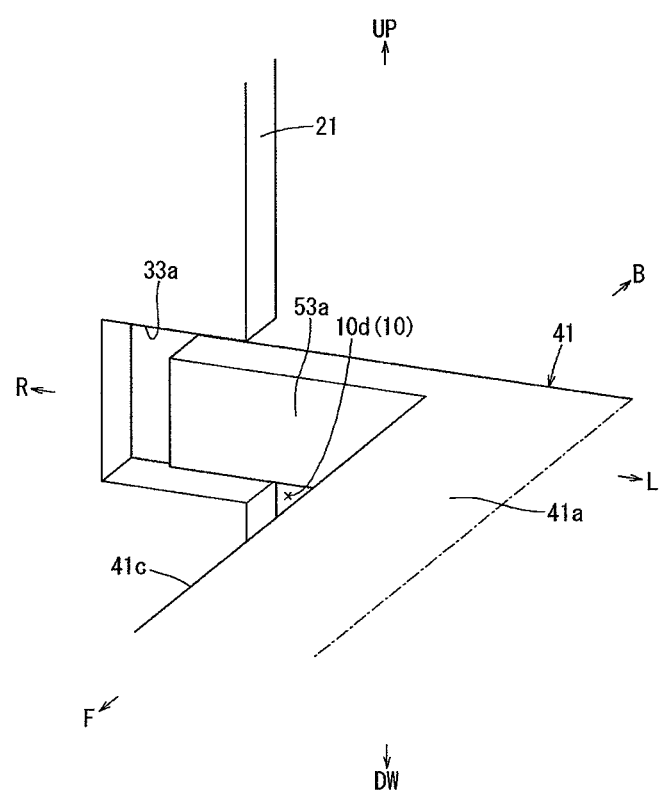
FIG. 5 is a perspective view illustrating a part of a vehicle seat and a part of other installable component according to a modification example.

The reinforcing member, the engaging portions, and the engaged portions have various configurations other than the above-mentioned configuration. For example, in the modification example illustrated in FIG. 5, a plate-like reinforcing member 21 is attached to the back surface of the seat pad (not illustrated) and reinforces the seat pad. A pair of engaging portions 33a is parts which are formed by cutting out a part of the reinforcing member 21 in a substantially rectangular shape and protrudes inward from the side portions of the accommodating section 10 (only one engaging portion is illustrated in FIG. 5 for the purpose of convenience). Accordingly, in this modification example, plate-like engaged portions 53a protruding in the seat width direction are formed on both side surface portions 41c of the floor console 41 (only one side surface portion and one engaged portion are illustrated in FIG. 5 for the purpose of convenience). By inserting the engaged portions 53a into the engaging portions 33a to engage with each other, the floor console 41 is positioned and disposed in the accommodating section 10. As a result, according to this modification example, the relative movement of the floor console 41 in the vertical direction can be regulated by causing the engaging portions 33a to engage with the engaged portions 53a in the seat width direction.

The vehicle seat according to the embodiment is not limited to the above-mentioned embodiment, but may be modified in various forms. In the embodiment, the cutout-shaped accommodating section 10 is formed between a pair of seat backs 6a and 6b, but the configurations (the shape, the size, the formation position, and the number) of the accommodating section are not limited to this embodiment. For example, the accommodating section may be formed as a penetration hole penetrating the seat pad in the thickness direction of the seat pad or a non-penetration hole such as a recess having a depth in the thickness direction of the seat pad, as long as other installable component can be disposed therein. The accommodating section may be opened to the seating surface side, or may be opened to any appropriate surface of the seat back in consideration of the positional relationship with respect to the installable component.

This embodiment describes an example in which plural engaging portions 31 to 33 and plural engaged portions 51 to 53 are formed, but the configurations (such as the shape, the size, the formation position, and the number) of the constituent portions are not particularly limited. For example, at least one of the first to third engaging portions may be disposed to protrude into the accommodating section. In this case, corresponding engaged portions can be formed in the installable component depending on the number of engaging portions formed. The engaging portions and the engaged portions may have various shapes or sizes so long as they can engage with each other. For example, an engaging portion having various shapes such as a substantially J shape (ring shape in which a cutout is formed in a part thereof) can be employed as the ring-shaped first engaging portion. When any one of the second engaging portion and the third engaging portion is formed, the relative movement of the installable component in the vertical direction can be properly regulated by causing one engaging portion to greatly protrude into the accommodating section. The second engaging portion and the third engaging portion may be formed to face each other or may be formed not to face each other. The engagement configuration of the second engaging portion and the second engaged portion (the third engaging portion and the third engaged portion) according to this embodiment may be employed as the engagement configuration of the first engaging portion and the first engaged portion. The engagement configuration of the first engaging portion and the first engaged portion according to this embodiment may be employed as the engagement configuration of the second engaging portion and the second engaged portion (the third engaging portion and the third engaged portion). The first to third engaging portions may be formed of the reinforcing member itself or may be formed by attaching another wire material or the like to the reinforcing member.

In this embodiment, the floor console 40 is explained as an example of the installable component, but the type of the installable component is not limited. For example, a seat-configuring member such as an armrest and other seat installable components other than the seat back may be configured as the installable component.

In this embodiment, an exemplary configuration of the vehicle seat 2 and the floor console 40 is described, but the configuration of these members can be appropriately modified. For example, the seat back may be connected to the seat cushion itself or the vehicle floor surface so as to be raised, lowered or in a upright state. The configuration of this embodiment can be applied to vehicle seats of a vehicle, an aircraft, an electric train, or the like.

According to the present disclosure, the installable component can be appropriately positioned and disposed in the accommodating section of the seat back. According to the second and third aspects of the disclosure, the installable component can be more appropriately positioned and disposed in the accommodating section of the seat back.

What is claimed is:

1. A vehicle seat comprising:
   a seat cushion configured to receive buttocks of an occupant; and a seat back that is upraised with respect to the seat cushion, the seat back including: a seat pad having elasticity and that is configured to support a back of the occupant; a reinforcing member that is formed by a linear or planer member and that reinforces the seat pad; and
   an accommodating section provided in the seat pad, the accommodating section is configured to receive an installable component that is configured as a separate body that is separate from the seat back, wherein
   the reinforcing member is a frame of the seat back that is embedded in the seat pad and includes an integral one piece engaging portion that protrudes into the accommodating section from a position within the seat pad, the engaging portion is configured to engage with an engaged portion that is provided on the installable component, and
   the vehicle seat is configured to allow the installable component to be installed in the accommodating section while positioning the installable component with respect to the accommodating section in a state where the engaging portion and the engaged portion are engaged with each other.

2. The vehicle seat according to claim 1, wherein
   the accommodating section is opened toward a seating surface side of the seat back, and
   the engaging portion includes an upper engaging portion that protrudes into the accommodating section from the reinforcement member at an upper part with respect to the accommodating section, the upper engaging portion being engageable with the engaged portion of the installable component.

3. The vehicle seat according to claim 2, wherein
   the upper engaging portion includes a ring shaped portion that protrudes into the accommodating section, the ring shaped portion being configured to be engaged with the engaged portion of the installable component from the seating surface side.

4. The vehicle seat according to claim 3, wherein
   the ring shaped portion is engaged with a plate-portion of the engaged portion of the installable component.

5. The vehicle seat according to claim 1, wherein
   the engaging portion includes a lateral engaging portion that protrudes into the accommodating section from the reinforcement member at a side part with respect to the accommodating section, the lateral engaging portion being engageable with a recess portion included in the engaged portion of the installable component.

6. The vehicle seat according to claim 1, wherein
   the accommodating section is provided in the seat pad as a cutout that is opened to a front side of the seat back.

7. The vehicle seat according to claim 1, wherein
   the accommodating section is provided in the seat pad as a through hole that is opened to a front side and to a back side of the seat back.

8. The vehicle seat according to claim 1, wherein
   the accommodating section is configured to receive a part of the installable component.

9. The vehicle seat according to claim 1, wherein
   the accommodating section is provided at a lower position of the seat back and allows the installable component to be installed at a position between the seat back and a floor of a vehicle on which the vehicle seat is installed.

10. The vehicle seat according to claim 1, wherein
    the engaging portion is configured to allow the installable component to be positioned in the accommodating section while being engaged with the engaged portion.

11. The vehicle seat according to claim 1, wherein
    the engaging portion protrudes into the accommodating section along a protruding direction that is parallel to a surface of the seat back that is configured to support the back of the occupant.

* * * * *